Jan. 25, 1949.  A. P. ADAMSON  2,460,115
ROTATION RATE CHANGE GENERATOR
Filed June 18, 1946
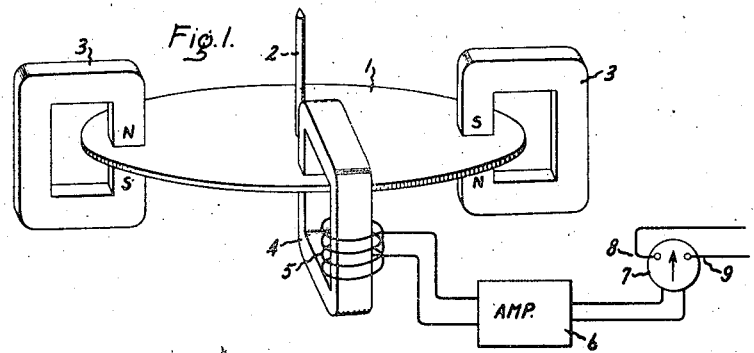
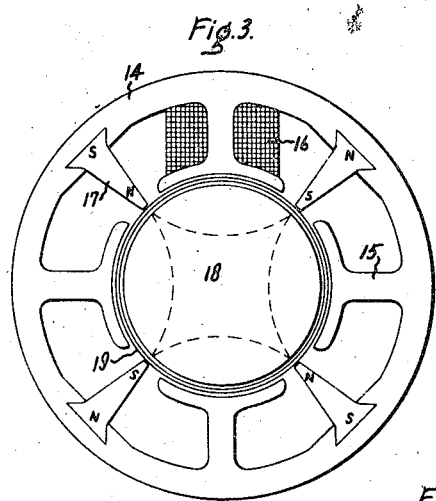
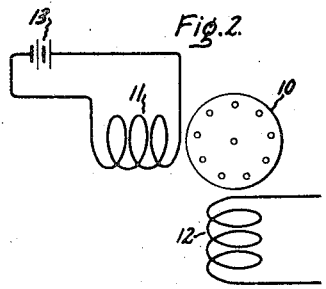
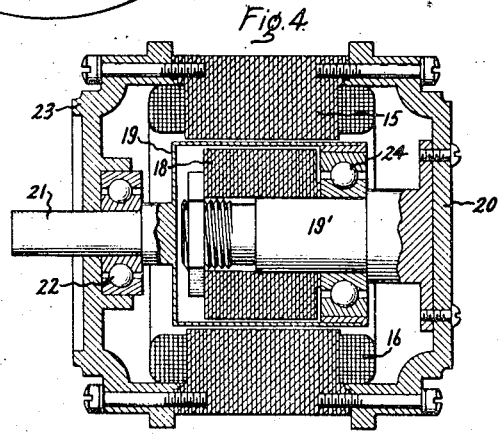
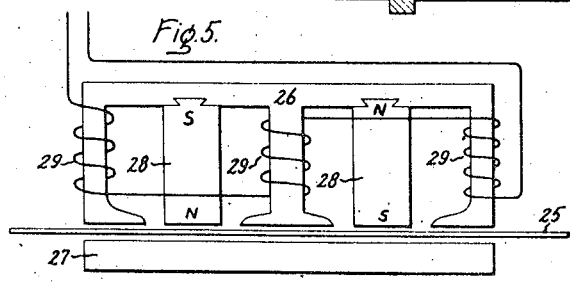
Inventor:
Arthur P. Adamson,
by Rowell S. Mack
His Attorney.

Patented Jan. 25, 1949

2,460,115

UNITED STATES PATENT OFFICE 2,460,115

ROTATION RATE CHANGE GENERATOR

Arthur P. Adamson, Ballston Spa, N. Y., assignor to General Electric Company, a corporation of New York Application June 18, 1946, Serial No. 677,456

4 Claims. (Cl. 171—209)

My invention relates to accelerometers and its object is to provide highly accurate acceleration measuring apparatus, producing a direct current voltage proportional to acceleration and which is useful over a wide range of velocities.

In carrying my invention into effect, I make use of an eddy current conducting member which is moved by or in proportion to the movement of the apparatus the acceleration of which it is desired to measure. Eddy currents are induced in such member by a stationary unidirectional flux magnet and changes in such eddy currents induce a measurement voltage in a stationary pickup coil. The apparatus may take a variety of forms depending, for example, upon whether angular or linear acceleration is to be measured, and the electrical characteristics may be modified to adapt the accelerometer for measurement over different ranges of velocity. The apparatus indicates both positive and negative acceleration simply by observing the polarity of the measurement voltage.

The features of my invention which are believed to be novel and patentable will be pointed out in the claims appended hereto. For a better understanding of my invention, reference is made in the following description to the accompanying drawing in which Fig. 1 represents a schematic representation of an accelerometer having a disk armature explanatory of the theory of my invention; Fig. 2 is a schematic representation of a two-phase squirrel cage induction motor structure as used as an accelerometer according to my invention; Fig. 3 represents the magnetic circuit arrangement of a preferred embodiment of my invention for measuring the acceleration of rotary apparatus; Fig. 4 shows structural parts of such an accelerometer; and Fig. 5 indicates one arrangement of the invention for measuring linear acceleration.

Referring now to Fig. 1 for an explanation of the theory of my invention, there is here shown a conductor disk 1 mounted for rotation with a shaft 2. Adjacent the disk there is a pair of magnets 3 for producing a flux through the disk. The magnets may be permanent magnets as indicated or they may be electromagnets. When the disk is rotated, the flux of the magnets 3 in cutting the disk cause eddy currents to flow therein. The polarity of the magnets is such that the eddy currents produced by the two magnets tend to flow in the same direction in the vicinity of a pick-up magnet. If the rotation of the disk be uniform, the eddy current flow is uniform. If the speed is increased or decreased, the eddy currents increase or decrease, respectively. At 4 is a magnetic circuit embracing the disk and having a pickup coil 5 thereon. The coil 5 is sufficiently removed from the permanent magnet flux circuit so as to be noninductive with respect to the permanent magnet flux. Some of the eddy currents flowing in disk 1 flow in the vicinity of the pickup magnet 4 which is preferably laminated to reduce eddy current losses therein, and when there is a change in the magnitude of the eddy currents due to acceleration of disk 1 either plus or minus, there is a corresponding change in flux through magnet 4 and the pickup coil 5, causing a voltage to be produced in the pickup coil. The voltage will be small, especially with the inefficient arrangement of Fig. 1, so that an amplifier 6 will be desirable to amplify the voltage to a value where it can operate an indicating instrument 7. The voltage induced in coil 5 will be proportional to acceleration, and a measure of such acceleration and its direction will be different for positive and negative accelerations. The amplifier and instrument may be arranged to respond to indicate the direction and magnitude of such acceleration. For instance, the amplifier 6 may be biased to pass current corresponding to a midscale deflection of instrument 7 when there is no acceleration, and to produce a decreased current and indication for negative acceleration and an increased current and indication for positive acceleration. The instrument may then have a scale calibrated accordingly. For accelerations which exceed a predetermined value, the instrument may act as a relay to close control relay contacts indicated at 8 and 9.

In place of the indicating apparatus illustrated, the acceleration voltages may be applied to an oscillograph.

Another form of generator for producing acceleration voltages is represented in Fig. 2. Here a structure similar to a two-phase squirrel cage motor is represented where 10 represents a squirrel cage rotor and will be driven by the machine or apparatus under investigation. Eleven (11) and 12 are exciting and pickup windings, and 13 represents a source of direct current excitation for winding 11. When the rotor 10 is driven and winding 11 excited, currents will be produced in the squirrel cage and changes therein will produce a voltage in the pickup winding 12.

A preferred form of eddy current acceleration voltage generator is represented in Figs. 3 and 4 and is designed with a view to low inertia, efficient operation and utility over a considerable range of speed. The stator structure has a magnetic circuit shown in Fig. 3. Magnetic laminations form the yoke 14 and the pole pieces 15 for the pickup coils 16. Excitation is provided by permanent magnets 17 keyed into the laminations of the yoke 2 and projecting close to the rotor air gap between the pickup coil poles 15. These permanent magnets are of a trapezoid cross-sectional shape and are designed to produce a concentrated field at the air gap. There are four of each type of pole pieces shown in the generator but this is not significant. Alternate permanent magnet poles have a reversed polarity adjacent the air gap as indicated. The stator also includes a cylindrical stationary inner laminated magnetic core 18 which greatly increases the efficiency of the machine, as by its use a much larger amount of permanent magnet flux can be forced through the rotor 19, which is a thin cylindrical shell of conductor material which rotates in the circular air gap between the outer stator pole pieces and the inner laminated magnetic core 18. It is evident that permanent magnet flux from a north pole to a south pole will pass through the inner magnetic core, as indicated by dotted lines, and thus pass through the rotor conductor 19 twice. The inner core 18 is held stationary and concentric with the rotor and air gap by a stationary stud 19' secured to an end shield 20. The end shields also support the stator pole piece structure as represented in Fig. 4. The rotor conductor 19 is secured to a drive shaft 21 having a bearing 22 in the left end shield 23 as seen in Fig. 4. The right end of the rotor is rotatively supported by a ball bearing 24, the stationary portion of which is secured on stud 19' as shown. The rotor thus has low inertia.

While only one pickup coil is represented in Fig. 3, such coils will be used on all four of the pickup coil pole pieces and these coils will be connected in series to cause the acceleration pickup voltages to add. Thus adjacent pickup coils will be reversed in the series connection as in a four-pole direct current motor or generator. The permanent magnet poles are preferably permanently magnetized after the rotor core 18 is assembled in the pole piece structure as by so doing, they will retain a higher degree of permanent magnetism than would be the case if subject to the knockdown effect of an open magnet circuit occasioned by absence of the inner core 18. Magnetizing coils for this purpose may be wound on the permanent magnet pole pieces 17 and may be left on permanently so as to be used again in case it becomes necessary as, for example, in case the machine is disassembled for any reason. The permanent magnet excitation available preferably should be such as to provide a high flux density approaching saturation in such permanent magnets. In the case of direct current excitation the teeth carrying the exciting flux should be saturated. The iron in the signal flux circuit should not be saturated. These factors contribute to good sensitivity over a wide speed range. The machine may be calibrated by overspeeding the rotor to a point where armature reaction is produced. That is, where the armature eddy currents are so excessive as to start holding back the unidirectional flux. This produces some stabilizing knockdown of the permanent magnets. The machine will then remain stable and produce an output voltage proportional to acceleration at all lower speeds.

In Fig. 5, I have shown a form of the invention for measuring linear acceleration of a conductor strip 25 which is assumed to have a linear horizontal motion through an air gap between a polar magnetic structure 26 and a magnetic return path or keeper 27. Eddy currents are set up in the strip 25 when in motion by flux produced by permanent magnets 28. Changes in such eddy currents produce voltage in pickup coils 29. The magnetic circuits with the exception of the permanent magnets are preferably laminated to prevent eddy current losses therein.

It is to be noted from Fig. 3 that the pickup coil pole pieces 15 have pole faces which are extended peripherally of the rotor so as to cover about three-fourths of the complete rotor peripheral area. Thus a large percentage of the eddy currents produced are utilized in inducing flux in such pole pieces, and the device thus operates at high efficiency for its intended purpose.

The characteristics of the acceleration voltage generator may be changed somewhat by substituting rotors having different resistances. For instance, the rotor may be made of copper, aluminum, or a suitable conductor alloy. A low resistance rotor will produce more eddy currents at a given speed than a high resistance rotor. Hence for acceleration measurements at low speeds a low resistance rotor would usually be selected.

The output of the acceleration generator may be used for many purposes. I have used it for stabilizing the operation of heavy machinery where the output voltage corresponds to the rate of acceleration of the machine stabilized. The acceleration generator may be driven at constant speed through a gear train to test the quality of the gears. It may be driven from an internal combustion engine to indicate acceleration torque pulses caused by engine detonations and the relative torque contributions produced by different cylinders of such an engine.

In accordance with the provisions of the patent statutes I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. An accelerometer comprising a current conductor, means for producing a unidirectional flux in said conductor, means for producing relative movement between said conductor and flux producing means in accordance with the acceleration movement to be investigated such that currents are produced in the conductor in proportion to such relative movement, a magnetic circuit embracing such conductor and sufficiently removed from the flux producing means so as to be threaded only by flux caused by current in the conductor and a pickup winding on the magnetic circuit in which voltages are induced by changes in the flux threading said magnetic circuit.

2. An accelerometer comprising a movable conductor moved in accordance with the acceleration to be investigated, stationary permanent magnet means for producing unidirectional flux in said conductor whereby eddy currents are produced in the conductor in proportion to its rate of movement, a stationary laminated magnetic circuit embracing the conductor such that flux is produced therein only by eddy currents flowing in the conductor, and a pickup winding in non-inductive relation to the flux of the permanent magnet means cut by changes in the flux threading said magnetic circuit.

3. An accelerometer having a stator comprising an outer pole piece structure and an inner core structure all composed of magnetic material, the pole piece structure comprising a magnetic yoke with an even number of pairs of inwardly projecting pole pieces, alternate pole pieces being magnetized as alternate north and south poles, and the remaining pole pieces having coils wound thereon, the inner core structure being centrally disposed within said pole pieces and separated therefrom by a circular air gap, a cylindrical rotor shell of conductor material mounted for rotation in said air gap, and means whereby said rotor may be driven, the magnetized stator poles producing fluxes through said conductor rotor such that eddy currents are produced therein when rotated, and the remaining poles having fluxes induced therein by such eddy currents.

4. An accelerometer comprising stator and rotor members, the stator member comprising an outer magnetic pole piece structure and an inner magnetic cylindrical core structure, the pole piece structure having an outer yoke with a plurality of evenly spaced inwardly projecting pole pieces made of laminated magnetic material and having an equal number of inwardly projecting pole pieces made of permanent magnetic material positioned between the laminated pole pieces, said permanent magnetic material pole pieces being polarized as alternate north and south poles, the inner magnetic core being laminated and positioned centrally within the stator so as to provide a circular air gap between the inwardly projecting pole pieces and inner core, the rotor comprising a cylindrical shell of conductor material mounted for rotation in the circular air gap such that when rotated eddy currents are produced therein by the flux of the polarized stator pole pieces and whereby fluxes set up by such eddy currents are produced in the laminated stator poles, and a winding comprising coils wound on the laminated stator poles connected in series relation to cause the voltages induced in such coils by changes in fluxes therethrough at any instant to add.

ARTHUR P. ADAMSON.

REFERENCES CITED

The following references are of record in the file of this patent:

UNITED STATES PATENTS

| Number | Name | Date |
| --- | --- | --- |
| 990,183 | Ashley | Apr. 18, 1911 |
| 1,842,553 | Lindenblad | Jan. 26, 1932 |
| 2,161,256 | Karcher | June 6, 1938 |